Sept. 4, 1934.   F. C. MOCK   1,972,200
INTERNAL COMBUSTION ENGINE
Filed April 10, 1931
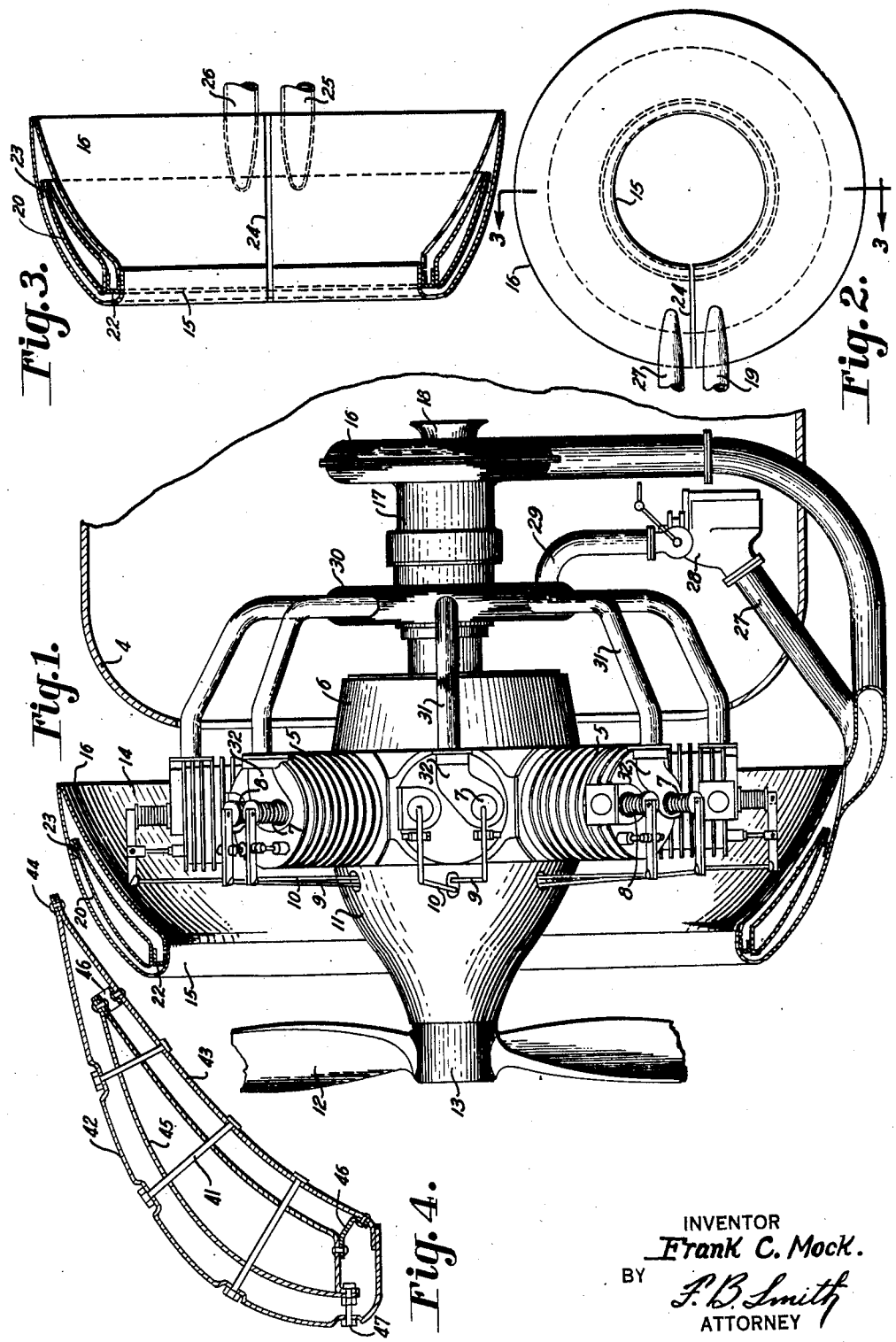
INVENTOR
*Frank C. Mock.*
BY
*F. B. Smith*
ATTORNEY Patented Sept. 4, 1934

1,972,200

UNITED STATES PATENT OFFICE 1,972,200

INTERNAL COMBUSTION ENGINE

Frank C. Mock, East Orange, N. J., assignor to Bendix Research Corporation, East Orange, N. J., a corporation of Indiana Application April 10, 1931, Serial No. 529,103

14 Claims. (Cl. 244—31)

This invention relates to internal combustion engines and more particularly to a supercharging apparatus for aircraft engines.

It has heretofore been proposed to increase the pressure of a fuel charge of an aircraft engine above that of the surrounding atmosphere to increase the power output and to compensate for decreases in atmospheric pressure due to altitude. It has also been proposed to cool the compressed charge prior to its delivery to the engine, but in such constructions it has been necessary to use special equipment increasing the weight and bulk of the aircraft.

It is one of the objects of the present invention to provide novel supercharging apparatus for aircraft engines in which the compressed charge is cooled prior to its entrance to the engine by utilizing a part of the aircraft construction as an intercooler.

Another object of the present invention is to provide novel supercharging apparatus for engines in which the engine cowling is utilized to cool the compressed charge prior to its delivery into the engine.

Another object of the present invention is to provide a novel intercooler in a supercharging apparatus for engines, which besides its function as an intercooler, constitutes an engine cowling for decreasing the wind resistance.

Another object of the present invention is to provide a novel supercharging apparatus for aircraft engines which is simple and compact, light in weight, and efficient for the purpose intended.

These and other objects will become more apparent from the following description and drawing in which like reference characters denote like parts throughout the several views. It is expressly understood, however, that the drawing is for the purpose of illustration only and does not define the limits of the invention, reference being had for this purpose to the appended claims.

In the drawing:

Fig. 1 is a side elevation of an aeroplane engine equipped with a device embodying the present invention;

Fig. 2 is an end elevation of the cowling shown in Fig. 1;

Fig. 3 is a cross sectional view of the cowling shown in Fig. 2 and taken on line 3—3 of Fig. 2; and Fig. 4 is a cross sectional view of the cowling used in another embodiment of the invention.

In Fig. 1 of the drawing the novel features of the present invention are illustrated as applied to an aircraft engine having a fuselage 4 and cylinders 5 radially disposed about a crankcase 6 and attached thereto in any suitable manner as is well known in the art. In the form shown, intake valve mechanism 7 and exhaust valve mechanism 8 are positioned on the head of each cylinder and adapted to be actuated by a moving part of the engine through rods 9 and 10, respectively. The forward or left-hand end of the crankcase, as is viewed in the drawing, has a stream-line contour for decreasing the wind resistance. A propeller 12 has its hub 13 rigidly secured to the crankshaft of the engine which extends through the stream-line portion 11 of the crankcase.

A cowling is provided for decreasing the wind resistance of the engine and preferably comprises an outer shell 14 of stream-line contour with the leading edge 15 of the greatest thickness and gradually decreasing toward the trailing edge 16. In the form shown, the leading edge 15 of the cowling is positioned between the propeller and the engine, and gradually increases its diameter so that the trailing edge 16 completely surrounds the engine.

A supercharger compressor 16 is preferably connected with the crankshaft at the rear of the engine as shown in Fig. 1, to offer as little wind resistance as possible. This compressor 16, of any suitable type, may be directly connected with the crankshaft, or through a train of reduction gearing; the casing 17 being provided to house such gearing. The air inlet to the compressor is shown in the center of the casing, as a convergent nozzle 18 tending to increase the velocity of the entering air. An outlet conduit 19 is provided for conducting the compressed air from the compressor 16 to the cowling.

In the preferred embodiment illustrated in the drawing, this cowling 14, besides decreasing the wind resistance, serves as an intercooler between the supercharger compressor 16 and the engine. To this end a core 20 is provided within the outer shell 14 and is attached to the shell by brackets 22 and 23 attached to the two members in any suitable way, such as by welding or brazing. Such a construction is very rigid even though light, thin gauge material is used, and also provides an annular chamber between the outer shell 14 and the inner core 20. Further rigidity may be secured, however, by use of through bolts as shown at 41 in Fig. 4, wherein is illustrated a modified cowling having a similar contour, but formed of two sheets 42 and 43 riveted to each other at 44, and to the inner core 45 by brackets 46 and through bolts 47.

As more clearly shown in Figs. 2 and 3, a baffle is provided between the outer shell 14 and the inner core 20 of the cowling in the form of a diaphragm 24. On one side of this diaphragm 24, and at the rear of the outer shell, an aperture 25 is provided for connection with the conduit 19. A second aperture 26 is also provided in the shell 14 of the cowling on the opposite side of the diaphragm 24 for connection with an outlet conduit 27. As shown the apertures are elliptical, so that the connection of the conduits 19 and 27 with the cowling may be made at an angle to give a larger area of connection and slight wind resistance.

The outlet conduit 27 leads from the cowling to the inlet side of a charge forming device herein illustrated as a carburetor 28, which may be of any well known type and which in turn is connected at its outlet by means of a conduit 29 to a mixing chamber and distributing manifold, consisting of an annular casing 30 surrounding the crankshaft. Rotating mechanism may be provided within the annular casing 30 for agitating the combustible charge, if desired, or the eddy currents formed by the changing direction of flow within the casing may be found sufficient to give the desired intimate contact and diffusion of the fuel in the air charge. Distributing conduits 31 extending radially from the periphery of the casing 30 at the rear of the cylinders offer little or no resistance to the wind and are connected with the individual intake passages 32 on the cylinder head.

The operation of the engine and supercharging device is as follows: The compressor 16, being directly or indirectly connected with the crankshaft of the engine, is rotated by the engine and draws in atmospheric air at the port 18 and discharges the same under pressure through the conduit 19. This compression of the air increases its temperature so that the density of air discharged is not increased to the greatest degree possible. To decrease the temperature and increase the density of the air, the conduit 19 directs the same into the annular chamber formed in the cowling 14, at one side of the diaphragm 24. As the outlet conduit 27 of the intercooler formed by the cowling is adjacent the conduit 19 but on the opposite side of the diaphragm 24, the air must traverse the entire area of the cowling through the shallow chamber between the outer shell 14 and the inner core 20, giving a large area of cooling surface, and decreasing its temperature. In this manner the density of the air discharged into the conduit 27 is considerably increased over the density of the air entering the cowling, resulting in an increased air charge available for use in the engine.

The compressed air is now directed through the charge forming device 28 where fuel is added; the charge of fuel and air discharging from the same through the conduit 29 into the mixing chamber 30. In the mixing chamber the fuel is mixed with the air charge to as high a degree as possible, from which chamber it is directed through the distributing conduits 31 to the individual intake ports 32 of the cylinders. The entrance of the combustible charge into the combustion chamber of the cylinders is controlled by the valve mechanism 7 actuated by the rod 9 and a rotating part of the engine (not shown) such as a cam shaft. Both the intake valve mechanism 7 and the exhaust valve mechanism 8 are actuated by a moving part of the engine at the proper time in the engine cycle to properly control the function of the engine, as is well known in the art.

As will now be readily apparent a supercharging apparatus has been provided in which the charge is cooled prior to its delivery to the engine by utilizing the cowling structure as an intercooler, and without increasing the weight or bulk of the aircraft. Further, a supercharging apparatus has been provided which is simple and compact, light in weight, and efficient for the purpose intended.

It will now be obvious that the invention is not limited to the specific form described and illustrated in the drawing, but is capable of a variety of mechanical embodiments. Various changes which will now appear to those skilled in the art may be made in the form, details of construction and arrangement of parts without departing from the spirit of the invention. For example, any type of engine, carburetor or compressor may be substituted for the form shown and the compressor need not necessarily be driven by the crankshaft of the engine. Further, the invention is not limited to the exact type of intercooler disclosed, or to the exact position as shown in the drawing.

Moreover, the points of entrance and exit of the air into and out of the intercooler may be varied to suit the requirements of different installations. Thus, where a downdraft carburetor is mounted above the centerline of the engine, the outlet from the intercooler may be positioned at the uppermost point on the cowling, instead of adjacent the inlet. In certain installations it may be desirable to rearrange the relative positions of the supercharger, intercooler and fuel mixing device so that a combustible mixture will be compressed. Reference should therefore be had to the appended claims for a definition of the limits of the invention.

What is claimed is:

1. In combination with an aircraft an internal combustion engine of the radial type, a propeller driven thereby, a fluid compressor, a hollow cowling for air cooling said engine, said cowling being adapted to act as an intercooler for said compressor, a partition in said cowling, and means operatively connecting said compressor, cowling, and engine including an inlet from the compressor to the cowling on one side of the partition and an outlet to the engine on the other side of the partition.

2. In combination with an aircraft an internal combustion engine of the radial type the combination of means for compressing fluid to be supplied to said engine, a hollow cowling for said engine arranged rearwardly of the propeller, means connecting said cowling with said compressor means and with said engine whereby said cowling acts as an intercooler for the fluid in its passage from the compressor means to the engine, and a partition in the cowling for directing air uni-directionally around the cowling.

3. In an apparatus for supercharging a radial internal combustion engine, the combination of means for compressing fluid to be supplied to said engine, a hollow cowling of airfoil cross section for said engine, conduit means connecting said cowling to said compressor means and to said engine, and means for causing said fluid to flow uni-directionally and traverse a substantial portion of said cowling in its passage from said compressor means to said engine whereby said cowling acts as an intercooler.

4. In apparatus for supercharging a radial internal combustion engine, the combination of a compressor, a hollow cowling surrounding said engine, conduit means connecting said cowling with said compressor and with the engine, and baffle means positioned in said cowling for causing the output of said compressor to flow uni-directionally and traverse a substantial portion of the circumference of said cowling in its passage from said compressor to said engine.

5. In apparatus for supercharging a radial internal combustion engine, the combination of a compressor, a hollow cowling for said engine, and means for causing the output of said compressor to uni-directionally circulate through a portion of said hollow cowling whereby the latter acts as an intercooler.

6. In apparatus for supercharging a radial internal combustion engine the combination of a supercharger, a hollow annular cowling for said engine, conduit means connecting the outlet of said supercharger to said cowling, conduit means connecting said cowling to the intake of said engine, and means between the conduits for causing the output of said supercharger to traverse a substantial portion of said cowling in its passage to said engine intake.

7. In combination with an aeroplane, a radial engine, and a supercharging apparatus comprising a compressor, a charge forming device, and an intercooler between said compressor and charge forming device including a hollow stream-line cowling for said engine said cowling constituting a uni-directional passage between the compressor and engine.

8. In combination with an aeroplane, a radial engine, and a supercharging apparatus comprising a compressor, a charge forming device, and an intercooler between the compressor and charge forming device in the form of a stream-line cowling for said engine, said cowling comprising an outer shell, and an inner core attached thereto, forming an annular chamber between the shell and core for directing the charge along the inner surface of the outer shell.

9. In apparatus for supercharging a radial internal combustion engine the combination of a compressor, a charge forming device, and an intercooler between said compressor and charge forming device comprising a stream-line cowling for said engine, said cowling having an outer shell and an inner core attached thereto for forming an annular chamber therebetween for directing the charge along the inner surface of the outer shell.

10. In apparatus for supercharging a radial internal combustion engine the combination of a compressor, a charge forming device, and an intercooler between said compressor and charge forming device, conduits leading from said compressor to said intercooler and from said intercooler to said charge forming device, said intercooler being in the form of a stream-line cowling for said engine having an outer shell and an inner core attached thereto for forming an annular chamber therebetween, and a diaphragm between the inlet conduit from the compressor and the discharge conduit to the charge forming device.

11. In an aircraft engine cowling, a stream-line outer shell, an inner core of substantially the same contour attached thereto for forming an annular chamber therebetween, and means for rigidly mounting said inner core within said shell.

12. An annular cowling for directing air flow around a radial engine to insure efficient cooling thereof, said cowling being hollow and of stream line cross section, and means forming an annular conduit within the hollow portion of said cowling, said conduit being adapted to form an inlet manifold for the engine.

13. An annular cowling for directing air flow around a radial engine to insure efficient cooling thereof, said cowling being hollow and of stream line cross section, means forming an annular conduit within the hollow portion of said cowling, sand conduit being adapted to form an inlet manifold for the engine, inlet and outlet pipes for said conduit, and means for causing gases to flow around said conduit in passing from the inlet to the outlet.

14. An annular cowling for directing air flow around a radial engine to insure efficient cooling thereof, said cowling being hollow and of stream line cross section, means forming a conduit within the hollow portion of said cowling, said conduit being adapted to form an inlet manifold for the engine adjacent inlet and outlet pipes for said conduit, and a baffle in said conduit arranged between said inlet and outlet pipes for causing gases to flow around said conduit in passing from the inlet to the outlet.

FRANK C. MOCK.